(12) United States Patent
Chiba (10) Patent No.: US 10,530,942 B2
(45) Date of Patent: *Jan. 7, 2020

(54) DATA PROCESSING APPARATUS

(71) Applicant: Sharp Kabushiki Kaisha, Osaka-shi, Osaka (JP)

(72) Inventor: Kunihisa Chiba, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 297 days.

This patent is subject to a terminal disclaimer.

(21) Appl. No.: 15/071,226

(22) Filed: Mar. 16, 2016

(65) Prior Publication Data

US 2016/0198054 A1 Jul. 7, 2016

Related U.S. Application Data

(63) Continuation of application No. 14/564,242, filed on Dec. 9, 2014, now Pat. No. 9,319,543, which is a
(Continued)

(30) Foreign Application Priority Data

Feb. 4, 2013 (JP) .................................. 2013-019342

(51) Int. Cl.
*G06F 3/0488* (2013.01)
*G06F 3/12* (2006.01)
(Continued)

(52) U.S. Cl.
CPC ..... *H04N 1/00456* (2013.01); *G06F 3/04883* (2013.01); *H04N 1/00381* (2013.01);
(Continued)

(58) Field of Classification Search
None
See application file for complete search history.

(56) References Cited

U.S. PATENT DOCUMENTS 8,904,304 B2 * 12/2014 Farago ................ G06F 3/04883
235/375
8,947,718 B2 * 2/2015 Chiba ....................... G06F 3/12
358/1.15
(Continued)

FOREIGN PATENT DOCUMENTS

CN 103034623 A * 4/2013 ............. G06F 17/25
WO WO-2013069430 A1 * 5/2013 ......... H04N 1/00411

OTHER PUBLICATIONS

Chiba, "Data Processing Apparatus", U.S. Appl. No. 14/564,242, filed Dec. 9, 2014.

*Primary Examiner* — Beniyam Menberu
(74) *Attorney, Agent, or Firm* — Keating & Bennett, LLP (57) ABSTRACT

A data processing apparatus includes a display portion, a control portion including a display control portion for causing the display portion to display a preview image of output target data, a touch sensor for receiving, on the display portion, a user operation for performing output setting for the output target data concerning the preview image, an output portion for outputting the output target data based on the output setting, and a control portion for, in a state where the display control portion arranges objects in page unit sequentially to be displayed as the preview image, when the touch sensor receives a predetermined pinch operation for the objects, performing page setting concerning the objects to be operated.

2 Claims, 5 Drawing Sheets

Related U.S. Application Data continuation of application No. 14/149,853, filed on Jan. 8, 2014, now Pat. No. 8,947,718.

(51) Int. Cl.
*G06F 3/14* (2006.01)
*H04N 1/00* (2006.01)

(52) U.S. Cl.
CPC ..... *H04N 1/00411* (2013.01); *H04N 1/00413* (2013.01); *H04N 1/00448* (2013.01); *G06F 2203/04808* (2013.01); *H04N 2201/0082* (2013.01); *H04N 2201/0094* (2013.01)

(56) References Cited

U.S. PATENT DOCUMENTS

| | | | | |
|---|---|---|---|---|
| 2006/0033952 A1* | 2/2006 | Oba | ............... | G06F 3/1206 358/1.15 |
| 2006/0250630 A1* | 11/2006 | Mori | ............... | G06F 3/1205 358/1.13 |
| 2011/0205171 A1* | 8/2011 | Akiyoshi | ............ | G06F 3/04883 345/173 |
| 2012/0086652 A1* | 4/2012 | Kim | ............... | G06F 3/1205 345/173 |
| 2012/0096378 A1* | 4/2012 | Kato | ............... | G06F 3/0486 715/769 |
| 2012/0243020 A1* | 9/2012 | Saito | ............... | B41J 3/46 358/1.13 |
| 2013/0016121 A1* | 1/2013 | Azuchi | ............ | G06F 3/04883 345/619 |
| 2013/0205210 A1* | 8/2013 | Jeon | ............... | G06F 3/04883 715/716 |
| 2013/0215059 A1* | 8/2013 | Lim | ............... | G06F 3/01 345/173 |
| 2014/0035946 A1* | 2/2014 | Chang | ............... | G06F 3/017 345/619 |
| 2014/0146330 A1* | 5/2014 | Miyata | ............ | G06F 3/1205 358/1.9 |
| 2014/0153060 A1* | 6/2014 | Takahashi | ......... | H04N 1/00411 358/468 |

* cited by examiner

DATA PROCESSING APPARATUS

This non-provisional application claims priority under 35 U.S.C. § 119(a) on Patent Application No. 2013-019342 filed in JAPAN on Feb. 4, 2013, the entire contents of which are hereby incorporated herein by reference.

FIELD OF THE INVENTION

The present invention relates to a data processing apparatus, and more specifically to a data processing apparatus which performs output setting for output target data and performs output of the output target data in accordance with the output setting.

BACKGROUND OF THE INVENTION

Conventionally, a data processing apparatus such as an image forming apparatus provided with a display portion for displaying a preview image of image data obtained by manuscript reading or the like as well as a touch sensor such as a touch panel capable of receiving a user operation has been distributed.

As to such an image forming apparatus, Japanese Laid-Open Patent Publication No. 2006-247873 discloses a technology that when a touch panel is touched so as to link preview images of manuscript of two pages displayed on a display portion in the horizontal direction, the two pages are printed as a spread page, and when the touch panel is touched so as to separate preview images of manuscript of two pages displayed on the display portion in the vertical direction therebetween, the two pages are printed so as to be arranged on a front and a rear of a sheet of paper.

However, in the technology described in Japanese Laid-Open Patent Publication No. 2006-247873, a touch operation does not intuitively lead to printing setting corresponding to the operation and, for a user who is unaccustomed to using the apparatus, the setting does not become as desired by the user, so that an erroneous operation is likely to be caused.

More specifically, in this technology, though the touch operation for linking the preview images of manuscript of two pages that are displayed in the horizontal direction is performed so as to make the two pages spread, the user misunderstands such a touch operation as an operation for moving the touched pages in the horizontal direction. Moreover, in this technology, though the touch operation for separating the displayed manuscript of two pages in the vertical direction therebetween is performed so as to arrange the two pages on a front and a rear, the user misunderstands such a touch operation as an operation for dividing the touched pages in the vertical direction therebetween.

On the other hand, the user also sometimes desires to change setting between double-side printing and single-side printing at the time of printing and to divide or combine files at the time of file outputting, while seeing preview images.

SUMMARY OF THE INVENTION

The present invention aims to provide a data processing apparatus capable of executing output setting such as setting of double-side printing/single-side printing at the time of printing and setting of separating (dividing)/combining of files at the time of file outputting, by a touch operation close to the result at the time of outputting output target data.

An object of the present invention is to provide a data processing apparatus comprising a display portion, a display control portion for causing the display portion to display a preview image of output target data, a touch sensor for receiving, on the display portion, a user operation for performing output setting for the output target data concerning the preview image, and an output portion for outputting the output target data based on the output setting, wherein the data processing apparatus further comprising a control portion for, in a state where the display control portion arranges objects in page unit sequentially to be displayed as the preview image, when the touch sensor receives a predetermined pinch operation for the objects, performing page setting concerning the objects to be operated.

Another object of the present invention is to provide the data processing apparatus, wherein when the touch sensor receives an operation for pinching out one of the objects as the predetermined pinch operation, the control portion performs setting for separating pages concerning the one of the objects into a front page and rear page.

Another object of the present invention is to provide the data processing apparatus, wherein when the touch sensor receives an operation for pinching out two adjacent objects selected from among the objects which are set to be stored as one file as the predetermined pinch operation, the control portion changes to setting for dividing the one file into two files at a border of pages concerning the two objects.

Another object of the present invention is to provide the data processing apparatus, wherein when the touch sensor receives an operation for pinching in two adjacent objects among the objects as the predetermined pinch operation, the control portion performs setting for combining pages concerning the two objects.

Another object of the present invention is to provide the data processing apparatus, wherein when the touch sensor receives an operation for pinching in two adjacent objects which are set to be stored as separate files and are selected from among the objects as the predetermined pinch operation, the control portion changes to setting for combining the two files into one file at a border of pages concerning the two objects.

PREFERRED EMBODIMENTS OF THE INVENTION

Figure 1:
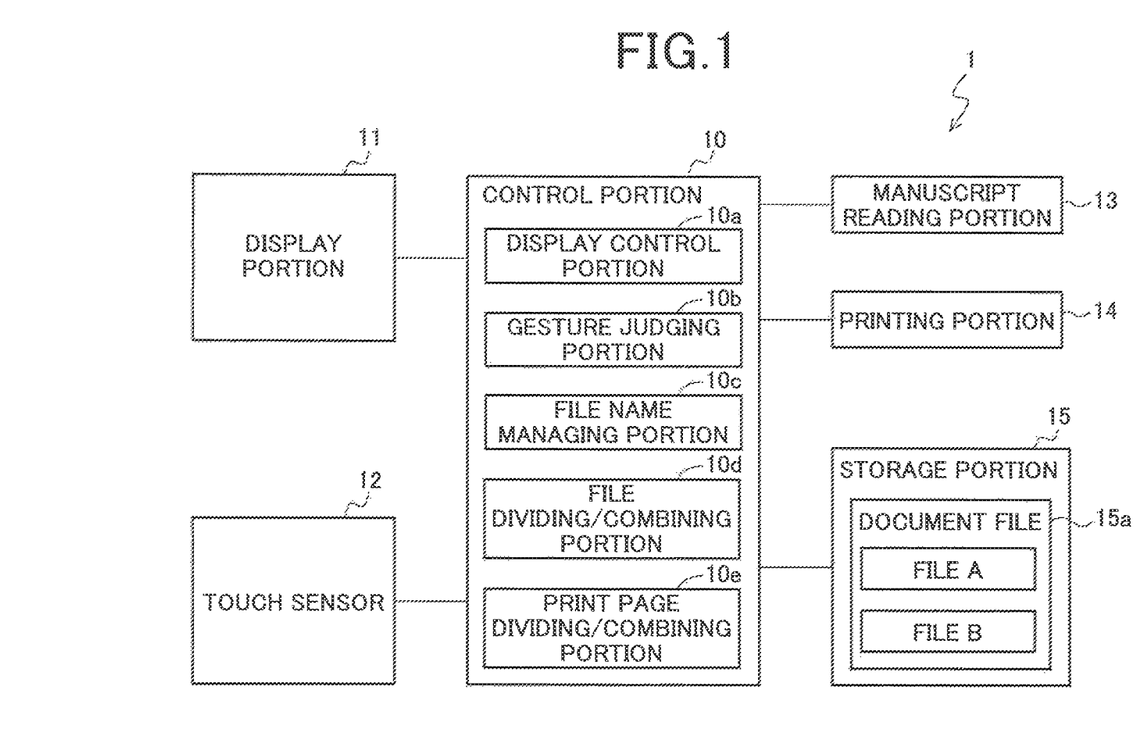
FIG. 1 is a block diagram showing a structure example of a data processing apparatus according to the present invention.

FIG. 1 is a block diagram showing a structure example of a data processing apparatus according to the present invention.

A data processing apparatus 1 according to the present invention is provided with a control portion 10 for controlling the whole of the data processing apparatus 1. In order to control the whole of the data processing apparatus 1, the control portion 10 is composed of control devices such as a CPU (Central Processing Unit) or an MPU (Micro Processing Unit), a RAM (Random Access Memory) as a working area, and a storage device that stores a control program (including a program for performing processing as described below according to the present invention) and various setting contents. As this storage device, a flash ROM (Read Only Memory), an EEPROM (Electrically Erasable and Programmable ROM), and the like are cited. Of course, a part or all of the control portion 10 is also able to be composed of dedicated hardware.

The data processing apparatus 1 is further provided with a display portion 11, a touch sensor 12 and an output portion as well as the control portion 10 is provided with a display control portion 10a for controlling display content on the display portion 11. The display control portion 10a also performs control to cause the display portion 11 to display a preview image of output target data read by a manuscript reading portion 13.

This preview image is actually displayed being incorporated in a user interface image (UI image). The display portion 11 is composed of a display panel for displaying an image, for example, such as a liquid crystal display or an organic EL (electroluminescence) display. This display portion 11 is preferably formed to be long laterally in order to display many pages to be seen easily simultaneously as a preview image.

The touch sensor 12 receives, on the display portion 11, a user operation for the UI image including the preview image displayed on the display portion 11. The user operation received by the touch sensor 12 is transferred to the control portion 10 and content of the user operation is interpreted in the control portion 10.

In addition, this user operation includes a pinch operation (a pinch in operation or a pinch out operation). Therefore, the touch sensor 12 is configured so as to be able to detect a plurality of points by fingers or the like simultaneously (corresponding to multipoint input). As the touch sensor 12, for example, touch sensors in various types, such as a projection-type electrostatic capacitance type, an (analogue) resistance film type, a photosensor built-in LCD (Liquid Crystal Display) type and an infrared type, are able to be adopted.

Furthermore, the data processing apparatus 1 is preferably configured to be provided with a hardware key group composed of, for example, numeric keys, a start key (execute key), a cancel key and the like, so as to receive various user operations.

The above-described output portion outputs the above-described image data based on output setting received by the touch sensor 12 (other setting may be basically default setting). As this output portion, a printing portion 14 for printing the above-described image data or a storage portion 15 for storing (saving) the above-described image data in a file format is cited, and the data processing apparatus 1 may be configured so as to enable output by both of them, as exemplified in FIG. 1.

Moreover, the data processing apparatus 1 exemplified in FIG. 1 is provided with a manuscript reading portion 13 for optically reading (scanning) original document (manuscript) and converting the manuscript into electronic data to thereby generate image data of the manuscript. By including the manuscript reading portion 13, it is possible to make the above-described output target data serve as image data obtained by optically reading the manuscript by the manuscript reading portion 13.

The printing portion 14 prints, on a recording paper, image data generated by the manuscript reading portion 13, image data received with a printing instruction from a not-shown personal computer (PC) (that is, image data received as a printing job), image data stored in a file format in the storage portion 15, and the like. Moreover, the printing portion 14 corresponds not only to single-side printing for printing on one side of a recording paper but also to double-side printing for printing on both sides of a recording paper. Furthermore, printing setting (single-side/double-side and the like) at the time of printing in the printing portion 14 may be stored in the storage portion 15. Note that, the PC and the data processing apparatus 1 are able to be connected through a wired/wireless network such as a LAN (Local Area Network) or in a peer-to-peer manner. A processing program of a printer driver or the like for the data processing apparatus 1 may be stored in the PC so as to be executable.

The storage portion 15 is composed of a hard disc and the like, and is able to save image data read by the manuscript reading portion 13, image data received from the PC, and the like as the output result in a file format. Note that, the storage portion 15 and the above-described storage device in the control portion 10 are also able to be mounted as a common device.

Moreover, the storage portion 15 is able to store one or a plurality of document files 15a as exemplified with a file A and a file B. The files A and B are files in which each page is configured by texts and/or embedded images. In the storage portion 15, for example, files which are originally stored in the storage portion 15 are divided into two files A and B to be saved, and therefore also able to be output. Moreover, the image data saved in a file format in the storage portion 15 is also able to be transmitted to an external device. Note that, as described above, even in a case where output target data is a text file composed of only texts (and a format thereof), if two files or one file with two or more pages exist, the files are able to be combined or separated, and therefore able to be regarded as an output target.

Moreover, as shown from the above-described structure example, as the data processing apparatus 1 according to the present invention, including a multi-functional peripheral (MFP) having a plurality of functions such as a print function (function for executing printing by an instruction from outside such as the PC), a copy function, a file save function for a scanned image, and a file transfer function, a printer with a print function alone, a copier with a copy function alone, and the like are cited.

In addition, the control portion 10 of the data processing apparatus 1 according to the present invention, as a main feature thereof, in a state where the display control portion 10a arranges objects in page unit sequentially to be displayed as a preview image, when the touch sensor 12 receives a predetermined pinch operation for the objects, performs page setting concerning the objects to be operated.

Then, the setting content subjected to the page setting is to be reflected at the time of printing or file saving.

Here, when the output is file output (file saving), objects for each page of the output file are arranged sequentially as they are, and when a plurality of files are displayed, the display is performed so that the files are distinguishable. Moreover, even when the output is printing, as to pages to which single-side printing is set, objects for each of the pages are arranged sequentially, whereas, as to pages to which double-side printing is set, only one side thereof (preferably, front side) is displayed as the object.

As above, according to the present invention, it becomes possible to execute output setting such as setting of double-side printing/single-side printing at the time of printing and setting of separating (dividing)/combining of files at the time of file outputting, by a touch operation close to the result at the time of outputting image data, and the practical operation for pages/files are made closer to the result, thus making it possible to prevent the user from performing an erroneous operation.

As described above, as the pinch operation, there are a pinch out operation and a pinch in operation.

As an example using the pinch out operation, when the touch sensor 12 receives an operation for pinching out one of the objects as the above-described predetermined pinch operation, the control portion 10 may perform setting so as to separate pages concerning the one of the objects into a front page and rear page. This makes it possible to execute output setting such as changing from double-side printing to single-side printing at the time of printing and separating of files at the time of file outputting (file saving), by the pinch out operation close to the result at the time of outputting image data. Description thereof will be given below specifically.

As an example using the pinch in operation, when the touch sensor 12 receives an operation for pinching in two adjacent objects among the objects as the above-described predetermined pinch operation, the control portion 10 may perform setting so as to combine pages concerning the two objects. This makes it possible to execute output setting such as changing from single-side printing to double-side printing at the time of printing and combining of files at the time of file outputting (file saving), by the pinch in operation close to the result at the time of outputting image data. Description thereof will be given below specifically.

The data processing apparatus 1 will be described below specifically as being capable of corresponding to both the pinch out operation and the pinch in operation as well as corresponding to both printing and file saving as output, but may be able to correspond to only one of the operations or to only one of outputting.

The control portion 10 exemplified in FIG. 1 has the display control portion 10a as well as is able to interpret a user operation from the touch sensor 12 (touch operation), and, in addition, is provided with a gesture judging portion 10b, a file name managing portion 10c, a file dividing/combining portion 10d and a print page dividing/combining portion 10e as follows.

The gesture judging portion 10b judges what touch operation the user operation to the touch sensor 12 is as a gesture. The pinch out operation and the pinch in operation are able to be judged as one of this gesture. Moreover, the file name managing portion 10c manages a registered name of a file. The file dividing/combining portion 10d controls dividing and combining of files. The print page dividing/combining portion 10e controls dividing and combining of print pages.

Figure 2:
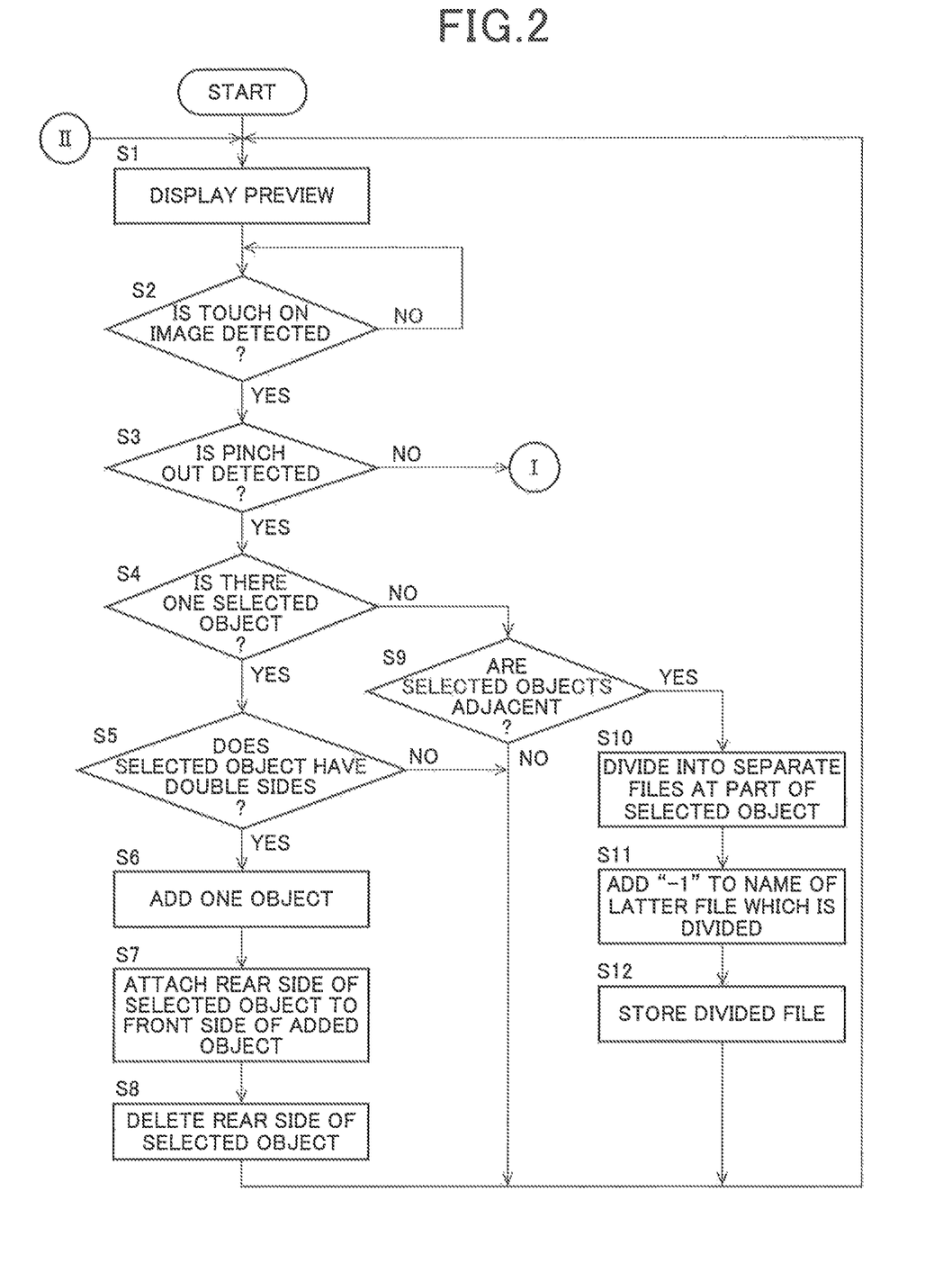
FIG. 2 is a flowchart for explaining an example of image processing in the data processing apparatus of FIG. 1.
Figure 3:
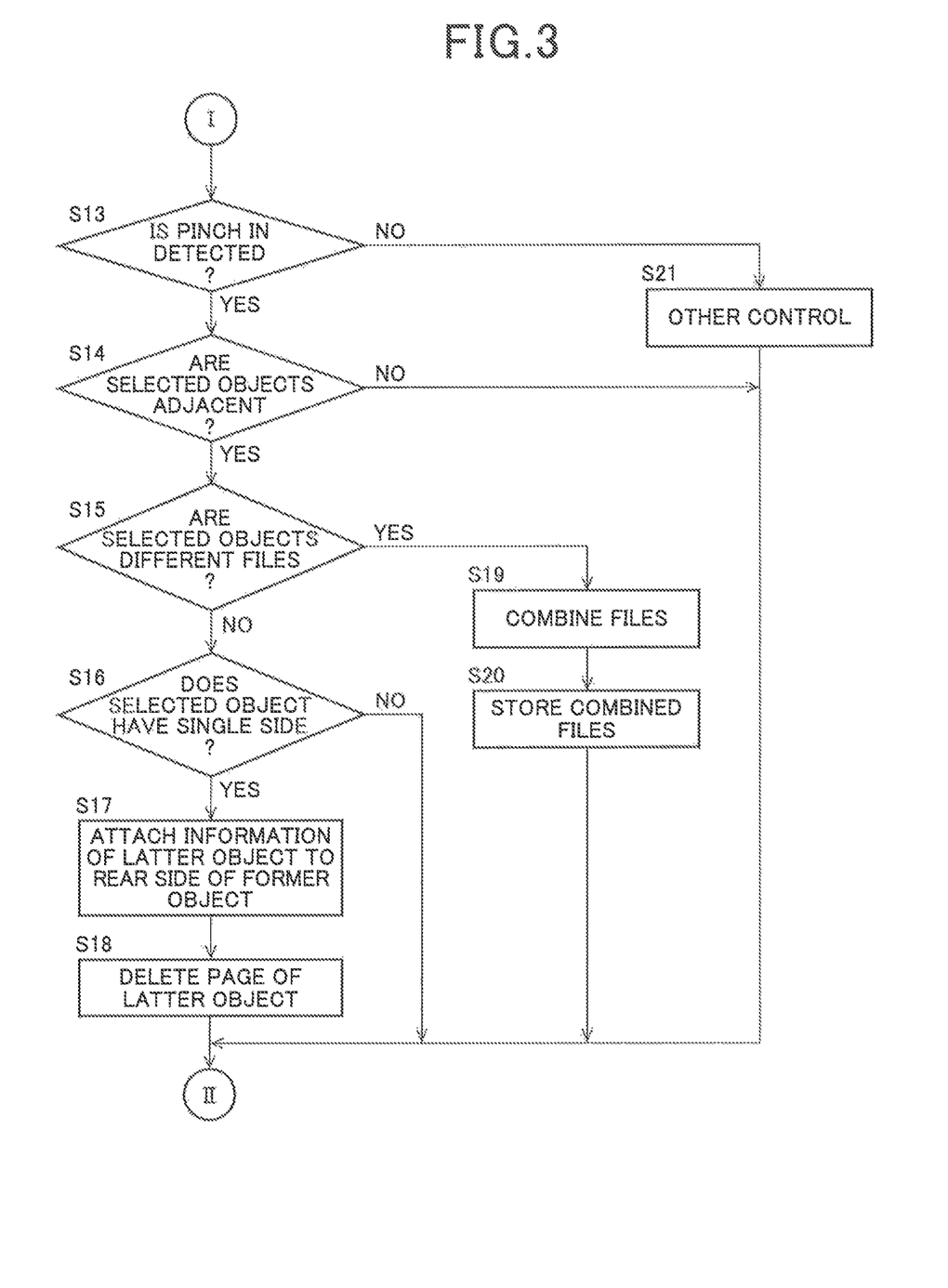
FIG. 3 is a flowchart following after FIG. 2.

Description will be given below for an example of image processing in the data processing apparatus 1 in such a structure example with reference to views subsequent to FIG. 2 in combination. Here, FIG. 2 is a flowchart for explaining an example of image processing in the data processing apparatus of FIG. 1, and FIG. 3 is a flowchart following after to FIG. 2. Moreover, FIG. 4A to FIG. 4D and FIG. 5A to FIG. 5D are views for explaining an example of a preview image showing a pinch operation and the output result for the operation of the present invention.

Figure 4A:
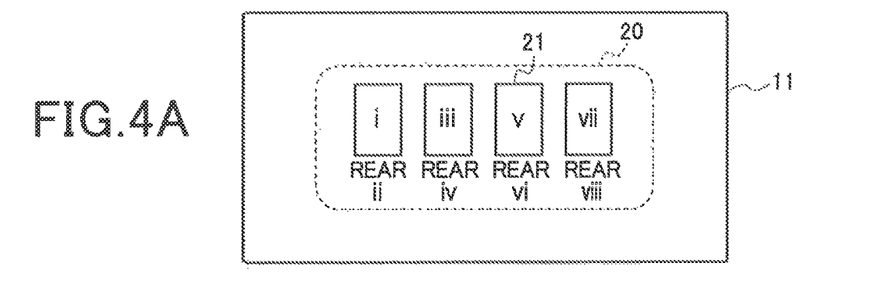
FIG. 4A is a view showing an example of a preview image on a display portion for explaining an example of image processing in the data processing apparatus of FIG. 1.
Figure 4B:
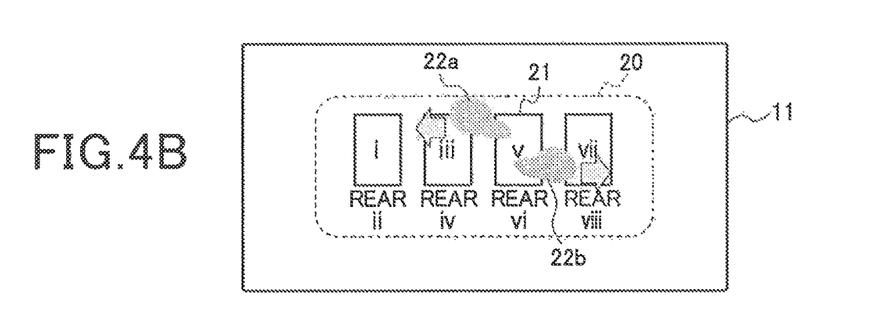
FIG. 4B is a view for explaining an example of a pinch out operation for the preview image of FIG. 4A.
Figure 4C:
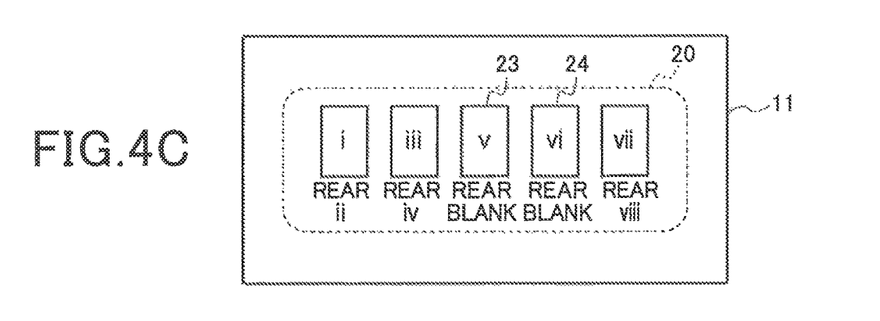
FIG. 4C is a view showing an example of a preview image displayed on the display portion by the pinch out operation of FIG. 4B.
Figure 4D:
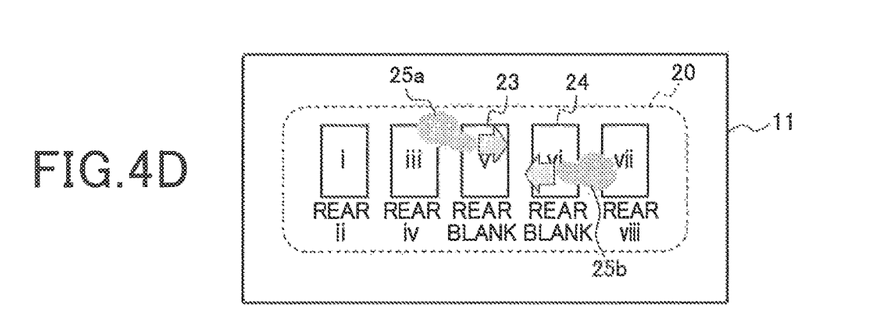
FIG. 4D is a view for explaining an example of a pinch in operation for the preview image of FIG. 4C.
Figure 5A:
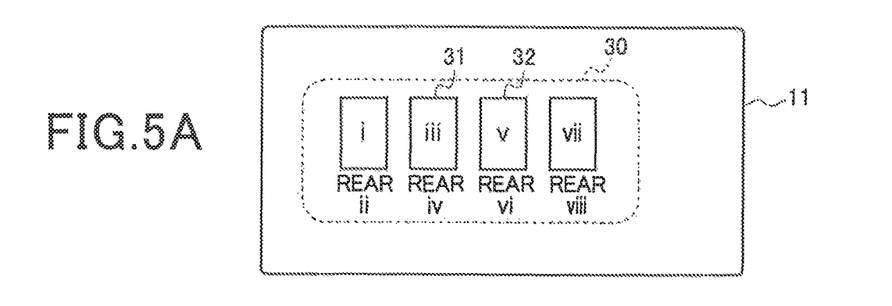
FIG. 5A is a view showing another example of a preview image on the display portion for explaining an example of image processing in the data processing apparatus of FIG. 1.
Figure 5B:
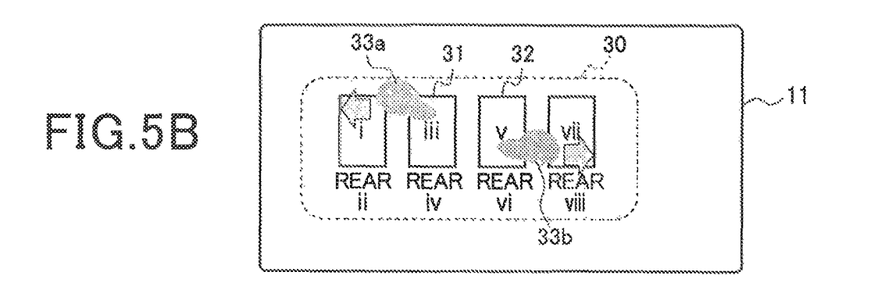
FIG. 5B is a view for explaining an example of the pinch out operation for the preview image of FIG. 5A.
Figure 5C:
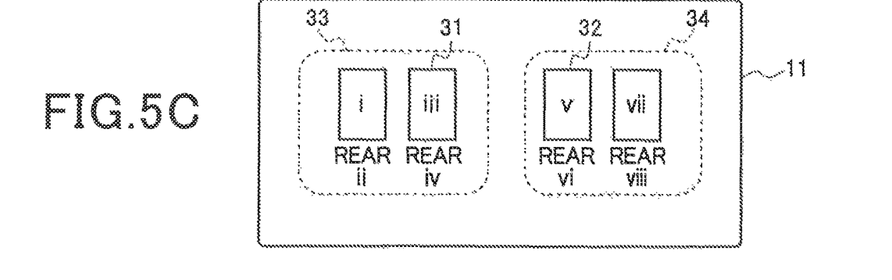
FIG. 5C is a view showing an example of a preview image displayed on the display portion by the pinch out operation of FIG. 5B.
Figure 5D:
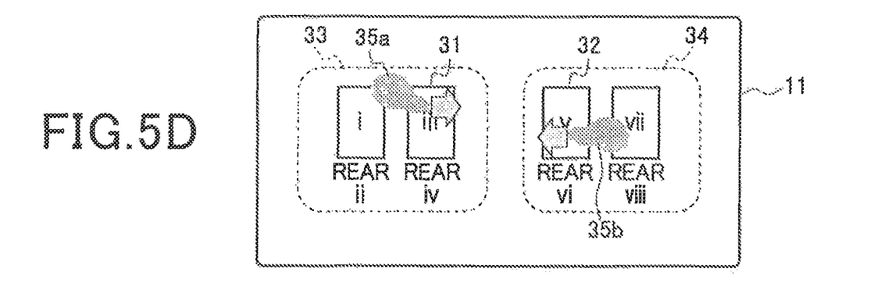
FIG. 5D is a view for explaining an example of the pinch in operation for the preview image of FIG. 5C.

FIG. 4A is a view showing an example of a preview image on the display portion 11 for explaining an example of image processing in the data processing apparatus 1, FIG. 4B is a view for explaining an example of a pinch out operation for the preview image of FIG. 4A, FIG. 4C is a view showing an example of a preview image displayed on the display portion 11 by the pinch out operation of FIG. 4B, and FIG. 4D is a view for explaining an example of a pinch in operation for the preview image of FIG. 4C. In addition, FIG. 5A is a view showing another example of a preview image on the display portion 11 for explaining an example of image processing in the data processing apparatus 1, FIG. 5B is a view for explaining an example of the pinch out operation for the preview image of FIG. 5A, FIG. 5C is a view showing an example of a preview image displayed on the display portion 11 by the pinch out operation of FIG. 5B, and FIG. 5D is a view for explaining an example of the pinch in operation for the preview image of FIG. 5C. In these views, page numbers are indicated in Roman figures in both front side and rear side.

First, the display control portion 10a generates a preview image of a file stored in the storage portion 15 and causes the display portion 11 to display a UI image including the preview image (step S1). The touch sensor 12 detects whether the UI image is touched (step S2), and when the touch is detected, detects a touch position simultaneously as well to transfer to the control portion 10. When the touch is not detected, the detection is waited for.

Next, responding to the detection result from the touch sensor 12, whether or not the operation after the touch is detected at step S2 is an operation for expanding fingers (that is, the pinch out operation) is judged by the gesture judging portion 10b (step S3). In the case of YES at step S3, whether or not there is one selected object is judged (step S4). Then, in the case of YES at step S4, whether or not the selected object is an object to which double-side printing is set is judged (step S5).

In the case of NO at step S5, the procedure returns to step S1 without performing processing. The case of YES at step S5 corresponds to a setting example that a page is separated when the output portion is the printing portion 14. Therefore, the print page dividing/combining portion 10e newly adds (inserts) one object to a page following the selected object (step S6). Then, the print page dividing/combining portion 10e reads an object concerning the manuscript on a rear side of the selected object to attach to a front side of the added object (step S7). After that, since the original data on the rear side of the selected object is unnecessary, the print page dividing/combining portion 10e deletes it (step S8), and the procedure returns to step S1.

A specific example will be given. As exemplifying a state of an operation for a preview image 20 of FIG. 4A with reference numerals 22a and 22b of FIG. 4B, when one object 21 showing a double-side sheet is selected and subjected to the pinch out operation, it becomes objects 23 and 24 of separate sheets as shown in FIG. 4C.

In this manner, when the touch sensor 12 receives the operation for pinching out one object selected from among the objects to which double-side printing is set, the control portion 10 changes to setting for performing single-side printing for a page concerning the one object, thereby performing setting for separating the page. This makes it possible to execute changing from double-side printing to single-side printing at the time of printing, by the pinch out operation close to the result at the time of printing image data. Note that, in this example, as described above, the display control portion 10*a*, as to the page to which double-side printing is set, essentially causes only one side thereof to be displayed as an object. Moreover, though description has been given assuming that the output portion in this example is the printing portion 14, the storage portion 15 is also applicable.

On the other hand, in the case of NO at step S4, whether or not the selected objects are two adjacent sheets is judged by the gesture judging portion 10*b* (step S9). In the case of NO at step S9, the procedure returns to step S1 without performing processing.

The case of YES at step S9 corresponds to a setting example that a page is separated when the output portion is the storage portion 15. Therefore, the file dividing/combining portion 10*d* divides a file into separate files at a selected point (a selected part of the object) (step S10), the file name managing portion 10*c* adds, for example, "-1" to a file name till then as a file name of the latter file which is divided (step S11), and the file dividing/combining portion 10*d* stores each divided file in the storage portion 15 (step S12). Thereafter, the procedure returns to step S1.

A specific example will be given. As exemplifying a state of an operation for a preview image 30 of FIG. 5A with reference numerals 33*a* and 33*b* of FIG. 5B, when two adjacent objects 31 and 32 are selected and subjected to the pinch out operation, the state becomes as shown in FIG. 5C. That is, as a file is divided at the position, a preview image 33 of a first file and a preview image 34 of a second file are displayed separately. Note that, a method of separating may be such as surrounding an object group of one file with dotted line as exemplified in FIG. 5B and FIG. 5C.

In this manner, when the touch sensor 12 receives an operation for pinching out two adjacent objects selected from among the objects which are set to be stored as one file, the control portion 10 changes to setting for dividing one file described above into two files at a border of pages concerning the two objects, thereby performing setting for separating the page. This makes it possible to execute separating of the file at the time of file saving, by the pinch out operation close to the result at the time of saving image data.

On the other hand, in the case of NO at step S3, the procedure moves to FIG. 3, and whether or not an operation after the touch is an operation for closing fingers (that is, the pinch in operation) is judged by the gesture judging portion 10*b* (step S13). In the case of NO at step S13, other control corresponding to the operation is performed (step S21), and the procedure returns to step S1.

In the case of YES at step S13, whether or not the selected objects are two adjacent sheets is judged (step S14). In the case of NO at step S14, the procedure returns to step S1 without performing processing. In the case of YES at step S14, whether or not the selected objects are objects of different files is judged (step S15). In the case of NO at step S15, whether or not single-side printing is set to each of the selected objects is judged (step S16).

In the case of NO at step S16, the procedure returns to step S1 without performing processing. The case of YES at step S16 corresponds to a setting example that pages are combined when the output portion is the printing portion 14. Therefore, the print page dividing/combining portion 10*e* attaches information (image data) of the selected latter object to a rear side of the former object (step S17) and deletes the page of the selected latter object (step S18), and the procedure returns to step S1.

A specific example will be given. As exemplifying a state of an operation with reference numerals 25*a* and 25*b* of FIG. 4D, when objects 23 and 24, each of which is a single-side sheet, are selected simultaneously and subjected to the pinch in operation, the objects 23 and 24 showing two sheets which have had single side as shown in FIG. 4A are turned to an object 21 of one sheet with each of which as a front side and a rear side (a page which has a smaller page number corresponds to the front side).

In this manner, when the touch sensor 12 receives the operation for pinching in two objects selected from among the objects to which single-side printing is set, the control portion 10 changes to setting for performing double-side printing with a page concerning one of the two objects as a front side and a page concerning the other as a rear side, thereby performing setting for combining the pages. This makes it possible to execute changing from single-side printing to double-side printing at the time of printing, by the pinch in operation close to the result at the time of printing image data. Moreover, in this example, the display control portion 10*a* preferably causes the page to which double-side printing is set to be displayed with only one side thereof as an object. In addition, though description has been given assuming that the output portion in this example is the printing portion 14, the storage portion 15 is also applicable.

On the other hand, the case of YES at step S15 corresponds to a setting example that pages are combined when the output portion is the storage portion 15. Therefore, the file dividing/combining portion 10*d* combines files including the selected objects (step S19) and stores the combined file (step S20), and the procedure returns to step S1.

A specific example will be given. As exemplifying a state of an operation with reference numerals 35*a* and 35*b* of FIG. 5D, when two adjacent objects 31 and 32 corresponding to different files are selected and subjected to the pinch in operation, the state becomes as shown in FIG. 5A. That is, as the files are combined at the position, a preview image 33 of a first file and a preview image 34 of a second file are displayed as a preview image 30 of one file without separation.

In this manner, when the touch sensor 12 receives the operation for pinching in two adjacent objects which are set to be stored as separate files and are selected from among the objects, the control portion 10 changes to setting for combining the above-described two files into one file at a border of pages concerning the two objects, thereby performing setting for combining the pages. Thus, since the two files are combined into one file, it is possible to execute combining of files at the time of file saving, by the pinch in operation close to the result at the time of saving image data.

As above, though description has been given for the data processing apparatus according to the present invention, as explained for processing procedure thereof, the present invention can take a form as a data processing method in the data processing apparatus configured as described above. This data processing method has a feature, in particular, in a data setting method, and has a step in which, in a state where a display control portion arranges objects in page unit sequentially to be displayed as a preview image, when a touch sensor receives a predetermined pinch operation for the objects, a control portion performs page setting concerning the objects to be operated. Other applications and effects are as described for the data processing apparatus, and description thereof will be omitted.

Moreover, the present invention can take a form as a program for causing the control portion in the data processing apparatus to execute the above-described data processing method (that is, a program for performing processing according to the present invention in the control portion 10 of FIG. 1). By storing this program in a storage device of the control portion 10 (or the storage portion 15) to read from the storage device for execution, functions according to the present invention are able to be realized.

Moreover, the present invention can take a form as a computer readable recording medium having this program stored therein. A portable recoding medium such as a CD (Compact Disc), a DVD (Digital Versatile Disc), a BD (Blu-ray Disc), or a Universal Serial Bus (USB: registered trademark) memory is used as an example for this recording medium. In this form, by reading the program by the control portion 10 from the above-described recording medium for execution or by reading the program by the control portion 10 from the above-described recording medium, storing it in the storage device of the control portion 10 (or the storage portion 15) and reading it from the storage device for execution, functions according to the present invention are able to be realized.

As explained above, the data processing apparatus according to the present invention is a data processing apparatus comprising a display portion, a display control portion for causing the display portion to display a preview image of output target data, a touch sensor for receiving, on the display portion, a user operation for performing output setting for the output target data concerning the preview image, and an output portion for outputting the output target data based on the output setting, and further comprising a control portion for, in a state where the display control portion arranges objects in page unit sequentially to be displayed as the preview image, when the touch sensor receives a predetermined pinch operation for the objects, performing page setting concerning the objects to be operated. This makes it possible to execute output setting by a touch operation close to the result at the time of outputting output target data.

Moreover, when the touch sensor receives an operation for pinching out one of the objects as the predetermined pinch operation, the control portion may perform setting for separating pages concerning the one of the objects into a front page and rear page. This makes it possible to execute output setting such as changing from double-side printing to single-side printing at the time of printing and separating of files at the time of file outputting (file saving), by the pinch out operation close to the result at the time of outputting output target data.

Here, as to a page to which double-side printing is set, the display control portion causes only one side thereof to be displayed as an object, and when the touch sensor receives an operation for pinching out one object selected from among the objects to which double-side printing is set as the predetermined pinch operation, the control portion may change to setting for performing single-side printing for a page concerning the one object. This makes it possible to execute changing from double-side printing to single-side printing at the time of printing, by the pinch out operation close to the result at the time of outputting output target data.

Alternatively, when the touch sensor receives an operation for pinching out two adjacent objects selected from among the objects which are set to be stored as one file as the predetermined pinch operation, the control portion may change to setting for dividing the one file into two files at a border of pages concerning the two objects. This makes it possible to execute separating of files at the time of file saving, by the pinch out operation close to the result at the time of saving output target data.

Moreover, instead, when the touch sensor receives an operation for pinching in two adjacent objects among the objects as the predetermined pinch operation, the control portion may perform setting for combining pages concerning the two objects. This makes it possible to execute output setting such as changing from single-side printing to double-side printing at the time of printing and combining of files at the time of file outputting (file saving), by the pinch in operation close to the result at the time of outputting output target data.

Here, when the touch sensor receives an operation for pinching in two objects selected from among the objects to which single-side printing is set as the predetermined pinch operation, the control portion may change to setting for performing double-side printing with a page concerning one of the two objects as a front side and a page concerning the other as a rear side. This makes it possible to execute changing from single-side printing to double-side printing at the time of printing, by the pinch in operation close to the result at the time of printing output target data.

Alternatively, when the touch sensor receives an operation for pinching in two adjacent objects which are set to be stored as separate files and are selected from among the objects as the predetermined pinch operation, the control portion may change to setting for combining the two files into one file at a border of pages concerning the two objects. This makes is possible to execute combining of files at the time of file saving, by the pinch in operation close to the result at the time of saving output target data.

As above, according to the data processing apparatus according to the present invention, it becomes possible to execute output setting such as setting of double-side printing/single-side printing at the time of printing and setting of separating (dividing)/combining of files at the time of file outputting, by a touch operation close to the result at the time of outputting output target data.

The invention claimed is:

1. A data processing apparatus, comprising:
 a display;
 a display controller operable to cause the display to display a preview image of an image data;
 a touch sensor operable to receive a touch operation by a user; and
 a controller operable to, when the touch sensor receives a predetermined pinch operation to objects in a state where the display controller displays the objects in page unit as the preview image, perform page setting concerning the objects to be operated; wherein
 when the touch sensor receives an operation for pinching out one of the objects as the predetermined pinch operation, the controller divides pages concerning the one object into two pages; and
 when the touch sensor receives an operation for pinching out two adjacent objects selected from among the objects which are set to be stored as one file as the predetermined pinch operation, the controller divides the one file into two files at a border of the pages concerning the two adjacent objects.

2. A data processing apparatus, comprising:
 a display;

a display controller operable to cause the display to display a preview image of an image data;

a touch sensor operable to receive a touch operation by a user; and a controller operable to, when the touch sensor receives a predetermined pinch operation to objects in a state where the display controller displays the objects in page unit as the preview image, perform page setting concerning the objects to be operated; wherein when the touch sensor receives an operation for pinching out two adjacent objects selected from among the objects which are set to be stored as one file as the predetermined pinch operation, the controller divides the one file into two files at a border of the pages concerning the two adjacent objects.

* * * * *